United States Patent [19]

Furuhata

[11] Patent Number: 5,227,964
[45] Date of Patent: Jul. 13, 1993

[54] SWITCHING POWER SUPPLY WITH OVERCURRENT PROTECTION CIRCUIT

[75] Inventor: Shoichi Furuhata, Kawasaki, Japan

[73] Assignee: Fuji Electric Co., Ltd., Kawasaki, Japan

[21] Appl. No.: 769,860

[22] Filed: Oct. 2, 1991

[30] Foreign Application Priority Data

Oct. 8, 1990 [JP] Japan .................. 2-269935

[51] Int. Cl.$^5$ ........................... H02M 7/5387
[52] U.S. Cl. ........................... 363/56; 363/21
[58] Field of Search ............. 363/19, 21, 23, 25, 363/75, 56

[56] References Cited

U.S. PATENT DOCUMENTS

| | | | |
|---|---|---|---|
| 4,104,715 | 8/1978 | Lawson, Jr. | 363/37 |
| 4,307,441 | 12/1981 | Bello | 363/25 |
| 4,415,960 | 11/1983 | Clark, Jr. | 363/21 |
| 4,438,485 | 12/1983 | Voigt | 363/21 |
| 4,706,177 | 11/1987 | Josephson | 363/24 |
| 4,777,578 | 10/1988 | Jahns | 363/98 |
| 4,888,821 | 12/1989 | Hamp, III et al. | 363/21 |
| 4,965,710 | 10/1990 | Pelly et al. | 363/56 |
| 4,975,592 | 12/1990 | Hahn et al. | 307/38 |
| 4,975,823 | 12/1990 | Rilly et al. | 363/56 |
| 5,032,745 | 7/1991 | Izadinia et al. | 307/571 |
| 5,032,774 | 7/1991 | Juzwik | 318/293 |
| 5,089,947 | 2/1992 | Driscoll et al. | 363/20 |

FOREIGN PATENT DOCUMENTS

| | | |
|---|---|---|
| 0031986 | 7/1980 | European Pat. Off. |
| 0192540 | 8/1986 | European Pat. Off. |
| 0345679 | 12/1989 | European Pat. Off. |
| 1469035 | 3/1977 | United Kingdom |
| 1473592 | 5/1977 | United Kingdom |
| 1597728 | 9/1981 | United Kingdom |

OTHER PUBLICATIONS

Bessyo et al., "A New Switching Power Supply for Magnetron Using a New Device and a Novel Transformere," PCIM '88 Proceedings, pp. 371-378.

*Primary Examiner*—Steven L. Stephan
*Assistant Examiner*—Ben Davidson
*Attorney, Agent, or Firm*—Spencer, Frank & Schneider

[57] ABSTRACT

A switching power supply having an overcurrent protective circuit which includes a detection resistor for detecting the primary current of a transformer to produce a detected voltage, a reference voltage circuit for producing a reference voltage, and an amplifier. The amplifier produces an overcurrent protective signal when the detected voltage exceeds the reference voltage, and supplies the overcurrent protective signal to the control terminal of a switching device which switches the primary current so that a drive signal for the switching device is decreased when an overcurrent of the secondary current occurs. The overcurrent is limited to a value equal to or less than the rated current of the switching power supply without an instantaneous interruption of the power.

3 Claims, 4 Drawing Sheets

SWITCHING POWER SUPPLY WITH OVERCURRENT PROTECTION CIRCUIT

BACKGROUND OF THE INVENTION

1. Field of the Invention

The present invention relates to a resonant switching power supply incorporating an overcurrent protection circuit, which is extensively used as a power supply for electronic equipment like an electronic computer, or as a horizontal deflection circuit of a television receiver.

2. Description of the Prior Art

A switching power supply generally includes, as a switching device, an insulated gate semiconductor device such as a power MOSFET, IGBT or the like, and regulates the direct current output voltage at a fixed voltage by controlling the on/off duration ratio of the switching device. Recently, power supplies of this type have been attracting attention as general purpose power supplies for electronic equipment because components of these power supplies can be miniaturized by turning on and off the switching device at a high frequency. In particular, a resonant switching power supply has been attracting great attention. This is because the resonant switching power supply has distinct characteristics such as low loss and low noise, and can supply a desired voltage both by stepping up or down an input voltage by selecting the turns ratio of a transformer of the power supply. These characteristics arises from the fact that the resonant power supply utilizes the resonance of an isolating transformer whose primary winding is connected in parallel with a resonant capacitor and hence the switching voltage and current take the shape of a sinusoidal waveform, thereby preventing sudden changes in the voltage and current.

FIG. 1 is a circuit diagram showing a conventional switching power supply. In this figure, a switching transistor 1 is connected with a diode 1A in inverse-parallel fashion, and the collector C of the transistor 1 is connected to a second terminal of a primary winding 2A of a transformer 2. The primary winding 2A is connected in parallel with a resonant capacitor 3. A first terminal of the primary winding 2A and the emitter E of the transistor 1 are connected to the positive and negative terminals of a direct current power supply 4, respectively. The direct current power supply 4, includes a bridge rectifier 4A and a smoothing capacitor 4C. The above-mentioned components constitute a primary main circuit.

On the other hand, a secondary winding 2B of the transformer 2 is connected to a direct current output circuit 5 including a full-wave rectifier 5A, a reactor 5B and a capacitor 5C so as to supply a direct current output to an external load.

A control circuit 6 supplies the base B of the switching transistor 1 with a driving signal 6S in the form of a rectangular pulse train through a serial resistor 14, and controls the on/off duration ratio of the switching transistor 1, thereby regulating the output voltage V2 of the switching power supply at a fixed voltage or a rated voltage.

More specifically, when the primary current of the transformer 2 is turned on and off by the switching transistor 1, a resonance voltage V1 with a sinusoidal waveform is generated in the primary winding 2A. Here, the waveform of the resonance voltage V1 is determined by the product of the leakage inductance of the primary winding 2A and the capacitance of the resonance capacitance 3. This resonance voltage induces in the secondary winding 2B an alternating positive and negative current which is rectified by the pair of diodes 5A, thus producing the direct current output voltage V2.

When the switching transistor 1 is turned off after it has been turned on so that a current flows through the transformer 2, a positive resonance voltage is applied to the collector of the transistor 1, and subsequently, a negative resonance voltage is applied to the collector. When the negative resonance voltage is applied to the switching transistor 1, the parallel diode 1A turns on, which turns off the switching transistor 1 during this period because the voltage applied across the collector C and emitter E is removed. Thus, the collector-to-emitter voltage (called collector voltage hereinafter) assumes a waveform similar to a sinusoidal waveform, preventing a sudden change of the voltage. In addition, since the switching transistor 1 turns off near zero cross points of the voltage, a power supply with low switching loss and noises is achieved.

In the switching power supply, when an overcurrent exceeding the rated current flows through the secondary of the transformer 2 owing to a discharge or the like across terminals of an external load, the corresponding primary current Ic abruptly increases, which in turn increases the primary voltage V1 in direct proportion to the current. Thus, an overcurrent and overvoltage exceeding the rated values are generated across the collector and the emitter of the switching transistor 1.

To protect the switching transistor 1 from damage by restricting such an overcurrent and overvoltage, a surge absorber 50 is connected in parallel with the resonant capacitor 3. In addition, at the secondary of the transformer 2, an overcurrent protective circuit 12 is provided. The overcurrent protective circuit 12, receiving a detected voltage from a current detection resistor 11 serially connected to the output circuit 5 to detect the overcurrent, performs inverse amplification of the detected voltage exceeding a normal value, and applies the output to a second input terminal of the AND gate 13A as a gate signal 12S. Thus, the drive signal 6S applied to a first input terminal of the AND gate 13A is stopped by the AND gate 13A, thereby restricting the overcurrent. The output terminal of the AND gate 13A is connected to the drive resistor 14 via an isolating transformer 13B so that the adverse effect of the voltage difference between the primary and secondary of the transformer 2 is eliminated.

The overcurrent protective circuit 12 temporarily interrupts the output of the switching power supply when the overcurrent is detected. Hence, in a switching power supply for electronic equipment which is adversely affected by an instantaneous break, the response speed of the overcurrent protective circuit is lowered, and the protective level against an overcurrent is set relatively high above the rated current. As a result, the surge absorber 50 is needed to protect the switching transistor 1 from damage. In addition, since the overcurrent is detected at the secondary of the transformer 2, the isolating transformer 13B is needed to isolate the overcurrent protective circuit 12 from the primary circuit. Accordingly, as the number of components increases, a more complicated circuit arrangement is required.

Furthermore, since the protective level against the overcurrent is made high, a switching device having a larger current capacity and higher withstanding voltage than is determined by the rated values must be used as the switching transistor 1. This poses another problem in that the switching power supply becomes expensive. Moreover, using a device of a high withstanding voltage hinders achieving a miniaturized, high performance power supply by adopting a switching device of a low saturation voltage and high switching speed, which presents still another problem.

SUMMARY OF THE INVENTION

Accordingly, it is an object of the present invention to provide a switching power supply with an overcurrent protective circuit having a simple circuit arrangement that can positively accomplish overcurrent protection with a high response speed.

The present invention provides a switching power supply comprising:

a transformer having a primary winding and a secondary winding;

a resonant capacitor connected in parallel to the primary winding;

a direct current power supply whose first output terminal is connected to a first terminal of the primary winding;

a switching device whose first terminal is connected to a second terminal of the primary winding, and whose second terminal is connected to a second output terminal of the direct current power supply, thereby switching a primary current flowing through the primary winding;

a control circuit for supplying a control terminal of the switching device with a drive signal via a serial resistance;

a rectifier circuit for rectifying a secondary current flowing through the secondary winding so as to output the rectified current as the output of the switching power supply; and an overcurrent protection circuit which includes:

a detection resistor for detecting the primary current to produce a detected voltage, reference voltage means for producing a reference voltage, and an amplifier which produces an overcurrent protective signal when the detected voltage exceeds the reference voltage and supplies the overcurrent protective signal to the control terminal of the switching device through the serial resistor so that the amount of the drive signal is decreased when an overcurrent of the secondary current occurs.

The switching device may be a power MOSFET in which the drain is the first terminal, the source is the second terminal and the gate is the control terminal.

The amplifier may be an operational amplifier whose inverting output is connected to the detected voltage through an input resistor, whose noninverting input is connected to the reference voltage, and whose output terminal is connected to the gate of the power MOSFET through the serial resistor.

The power MOSFET may be a current sense power MOSFET having a current sense terminal which is connected to the second output terminal of the direct current power supply via the detection resistor to produce the detected voltage.

The amplifier may be a comparator whose inverting input is connected to the detected voltage through an input resistor, whose noninverting input is connected to the reference voltage, and whose output terminal is connected to the gate of the current sense power MOSFET through the serial resistor.

The switching device may be a current sense IGBT in which the collector is the first terminal, the emitter is the second terminal and the gate is the control terminal, the IGBT further having a current sense terminal which is connected to the second output terminal of the direct current power supply via the detection resistor to produce the detected voltage.

The reference voltage means may be a Zener diode, and the amplifier may be a transistor whose emitter is connected to the second output terminal of the direct current power supply, whose base is connected to the detected voltage via a resistor, and whose collector is connected to the gate of the current sense IGBT through the Zener diode and the serial resistor.

The present invention has an overcurrent protective circuit for detecting an overcurrent which exceeds the rated current of the resonant switching power supply and which is caused by a discharge or the like between terminals of an external load of the power supply. The overcurrent protective circuit detects the overcurrent at the source of the power MOSFET switching the primary current of the transformer, inverts and amount corresponding to the difference between the overcurrent and the rated current by using an amplifier or the like, and adds the inverted signal to the driving signal. By determining the reference voltage of the amplifier in accordance with a protective level of the overcurrent, the driving signal can be timely reduced. Therefore, the gate voltage of the power MOSFET is reduced, thereby reducing the overcurrent to a value equal to or less than the rated current.

Thus, the present invention can limit the overcurrent below the rated current without interrupting the operation of the switching power supply. Consequently, the response delay which was necessary in the conventional overcurrent protective circuit in order to avoid undesirable operation can be eliminated. This makes it possible to timely protect the power MOSFET from the overcurrent and overvoltage, thereby preventing damage to it. In addition, reducing the maximum value of the resonant voltage can obviate the surge absorber 50 and the isolating transformer 13B which were necessary in the prior art, and enables the switching power supply to use a power MOSFET matching the rated current and rated voltage. This makes it possible not only to reduce the number of components of the circuit and to simplify the circuit, but also to provide an inexpensive, reliable switching power supply.

Furthermore, since the overvoltage can be limited by setting the maximum current value, a low saturation voltage, high speed switching device can be used. This makes it possible to provide a miniaturized, low loss and low noise switching power supply.

Moreover, detecting the overcurrent at the primary of the transformer enables a scale-down switching power supply to reduce the current capacity of the detection resistor, thereby miniaturizing it.

Furthermore, the present invention can be implemented by using a power MOSFET with a current sense terminal in place of a common MOSFET so as to detect an overcurrent by the current sense terminal, and in order to reduce the drive signal by adjusting the reference voltage of the comparator in accordance with the rated current value. This provides effects similar to those mentioned above. In addition, the detection resistor can be further miniaturized because the current capacity of the detection resistor can be further reduced.

Moreover, a switching power supply, which uses a power MOSFET with a current sense terminal in place of a common MOSFET so as to detect the overcurrent by the current sense terminal, and which employs an overcurrent circuit that includes a detection resistor, voltage dividing resistors, a transistor, and a zener diode, with the base voltage of the transistor being adjusted so as to correspond to the overcurrent protective level by the voltage dividing resistors, can provide effects similar to those mentioned above. In addition, the circuit configuration of the overcurrent protective circuit can be further simplified.

Finally, since the present invention protects the switching device from the overcurrent and overvoltage by limiting the overcurrent below and rated current value in such a way that no instantaneous power breaking interruption of the switching power supply will occur, it fulfills the requirements of the power supply for electronic equipment.

The above and other objects, effects, features and advantages of the present invention will become more apparent from the following description of the embodiments thereof taken in conjunction with the accompanying drawings.

DETAILED DESCRIPTION OF PREFERRED EMBODIMENTS

The invention will now be described with reference to the accompanying drawings.

EMBODIMENT 1

Figure 1:
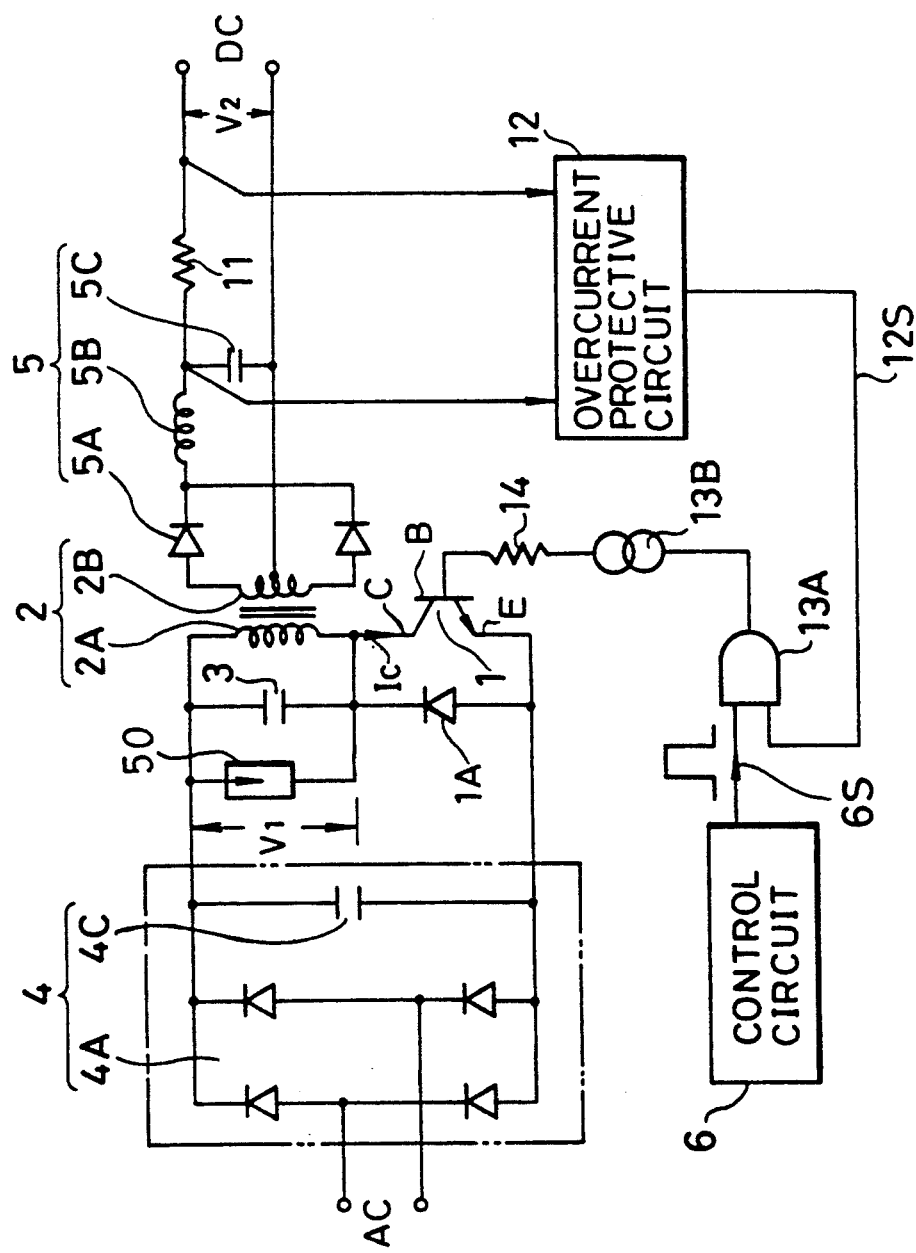
FIG. 1 is a circuit diagram showing a conventional switching power supply.
Figure 2:
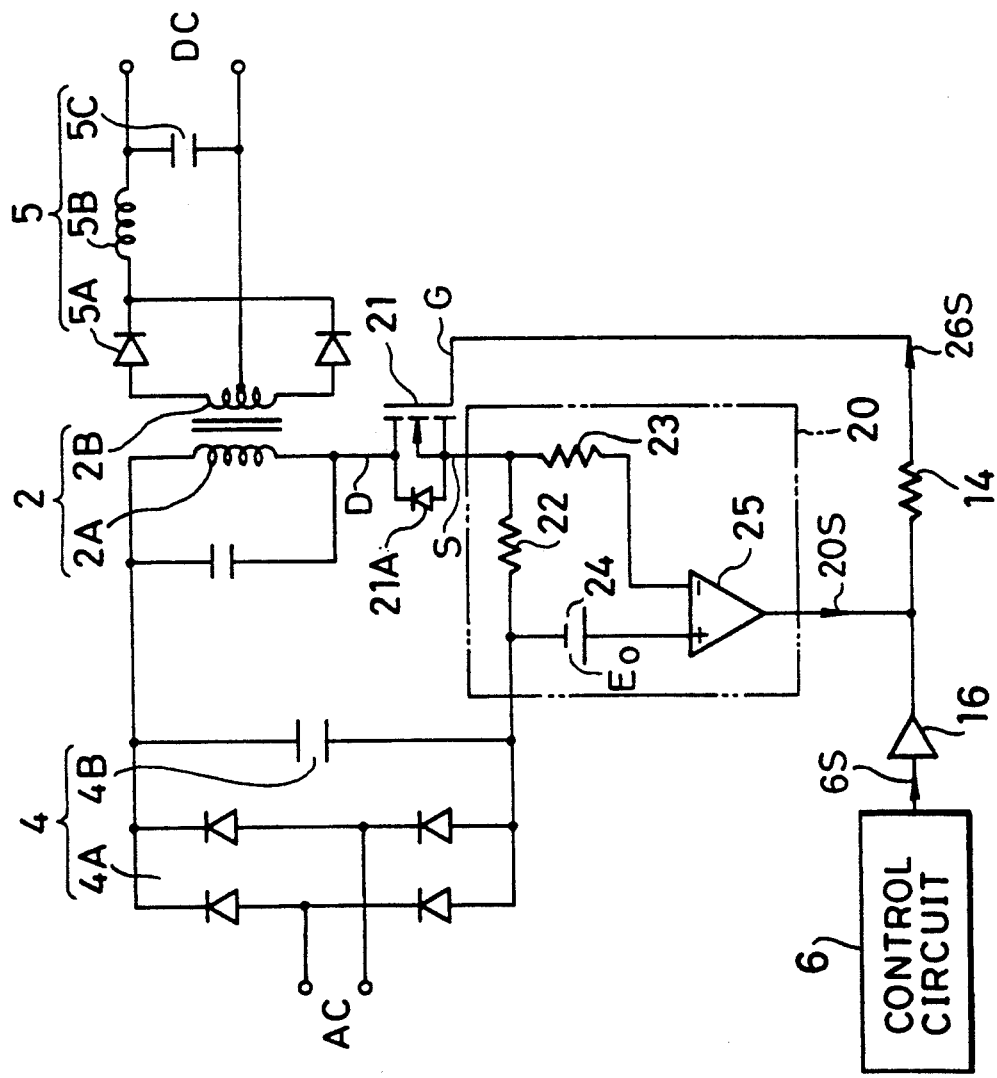
FIG. 2 is a circuit diagram showing a switching power supply in accordance with a first embodiment of the present invention.

FIG. 2 is a circuit diagram showing a switching power supply in accordance with a first embodiment of the present invention, in which like parts are designated by the same reference numerals as in the conventional power supply of FIG. 1.

In this figure, a power MOSFET 21 is connected between a second terminal of a primary winding 2A of a transformer 2 and the negative terminal of a direct current power supply 4, and functions as a switching device for switching the primary current of the transformer 2. Here, the drain D of the power MOSFET 21 is connected to the second terminal of the primary winding 2A, the source S is connected to the negative terminal of the direct current power supply 4 via a detection resistor 22, and the gate G is connected to the output terminal of a control circuit 6 via a serial resistor 14 and an amplifier 16.

During normal operation, the on/off duration ratio of the drive signal 6S produced by the control circuit 6 is controlled in accordance with an output current value supplied to an external load, thereby regulating the output voltage of the switching circuit at a predetermined value (e.g., at the rated voltage).

An overcurrent protective circuit 20 is composed of the detection resistor 22 for detecting the primary current at the source of the power MOSFET 21, an input resistor 23, an offset voltage source 24, and an operational amplifier 25. The operational amplifier 25 receives a detected voltage via the resistor 23, inverts the difference voltage between the offset voltage applied by the offset voltage source 24 and the detected voltage, and outputs the inverted voltage as an output signal 20S to be mixed with the output of the amplifier 16. Here, the offset voltage E0 of the operational amplifier is set at a value corresponding to a protective level of an overcurrent. The overcurrent protective circuit using the operational amplifier 25 is particularly advantageous for a fixed frequency resonant circuit.

The switching power supply FIG. 2 operates as follows: In normal operation where the output current is equal or less than the rated current, the output signal 20S of the overcurrent protective circuit 20 falls zero, and hence the driving signal 6S produced by the controlling circuit 6 is applied without change to the gate G of the power MOSFET 21 when the voltage gain of the amplifier is unity.

On the other hand, if an overcurrent occurs in the external load, and the detection voltage exceeds the offset voltage E0, the difference between the two voltages increases in direct proportion to the difference between the rated current and the output 20S of the overcurrent. Thus, the overcurrent protective circuit 20 is inverted and its amplitude increases in direct proportion to the difference. Therefore, the amplitude of the driving signal 26S applied to the gate G of the power MOSFET 21 is limited to the difference between the absolute values of the two signals 6S and 20S, that is, below the gate voltage corresponding to the rated current. By this, the primary current flowing across the drain and source of the power MOSFET decreases in direct proportion to the gate voltage or the drive signal, and hence, the power MOSFET is free from damage caused by the overcurrent. Accordingly, a power MOSFET whose current capacity matches the rated current can be used, resulting in an inexpensive switching power supply.

Furthermore, since the overvoltage applied to the resonant capacitor 3 and the power MOSFET is limited by the restriction of the main current, the surge absorber which was needed in the conventional power supply can be obviated. In addition, since the overcurrent is detected at the primary of the transformer 2, the isolating transformer can be also obviated, thereby reducing the number of components of the circuit, and simplifying the power supply.

Incidentally, the amplitude of the driving signal 26S when an overcurrent occurs, can be set at a value suitable for recovering from the abnormality of the external load by adjusting the resistance of the detection resistor 22, and/or the gain of the amplifiers 16 and 25. Accordingly, the power supply can protect the switching device from the overcurrent with no instantaneous power interrupting, which is one of the important requirements for a power supply for electronic equipment. As a result, an inexpensive, low loss, and further miniaturized switching power supply can be provided by using a low saturation voltage, high speed power MOSFET whose current capacity matches the rated current value.

EMBODIMENT 2

Figure 3:
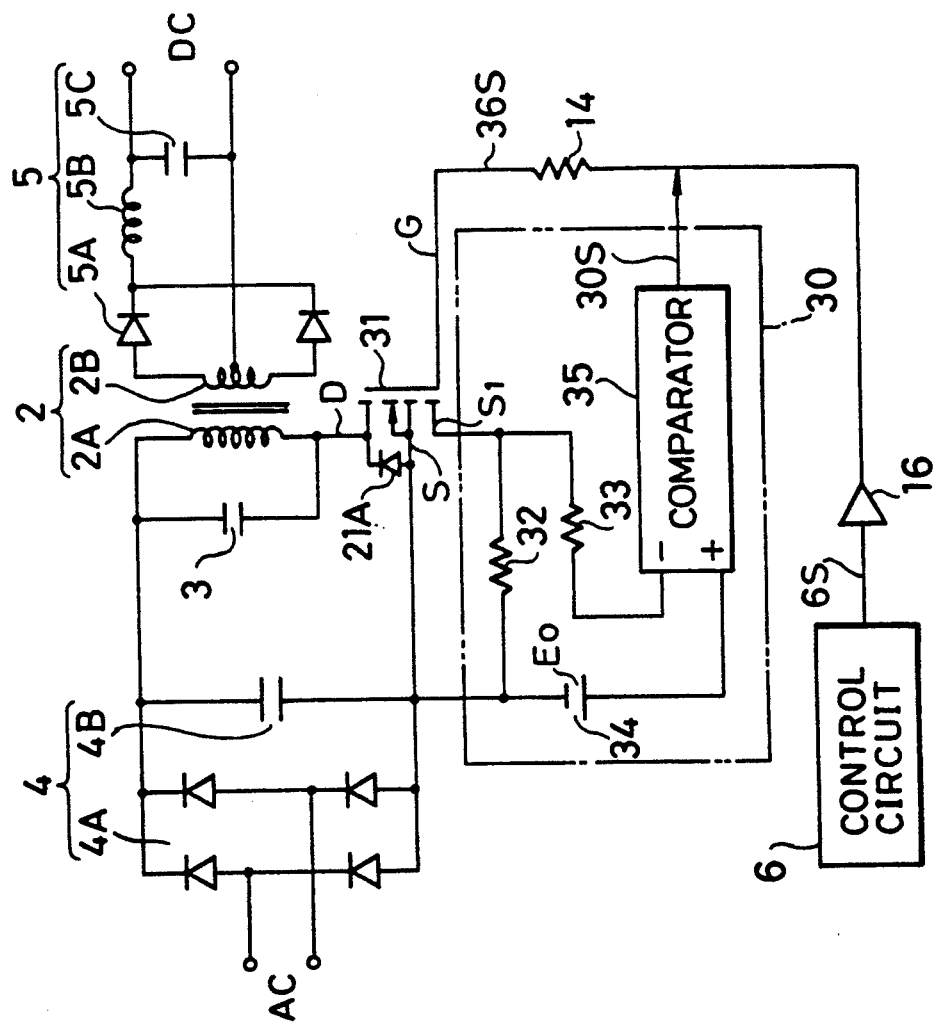
FIG. 3 is a circuit diagram showing a switching power supply in accordance with a second embodiment of the present invention.

FIG. 3 is a circuit diagram showing a switching power supply in accordance with a second embodiment of the present invention. This embodiment uses a power MOSFET 31 with a current sense function having another source S1 (current sense terminal) in addition to a source S for the main current. Here, the source S is connected to the negative terminal of a direct current power supply 4, whereas the current source terminal S1 is connected to the negative terminal through a detection resistor 32. The detection resistor 32, an input resistor 33, a reference voltage source 34, and a comparator 35 constitute an overcurrent protective circuit 30. The detected voltage produced by the detection resistor 32 is applied to the inverting input of the comparator 35 via the input resistor 33, and the reference voltage E0 is applied to the noninverting input of the comparator 35. Thus, the comparator 35 compares the detected voltage with the reference voltage E0. If the detected voltage exceeds the reference voltage E0, the comparator 35 applied a low level signal 30S to the output of an amplifier 16 which amplifies the output 6S of a control circuit 6. Therefore, the driving signal 36S is limited to a level corresponding to the difference of the absolute values of the two signals 6S and 30S, resulting in a reduction of the overcurrent to a value not greater than the rate current value. As a result, effects similar to those of the first embodiment can be achieved. In addition, since the current capacity oft he detection resistor 32 can be reduced, the detection resistor 32 can be further miniaturized in comparison with that of the first embodiment.

EMBODIMENT 3

Figure 4:
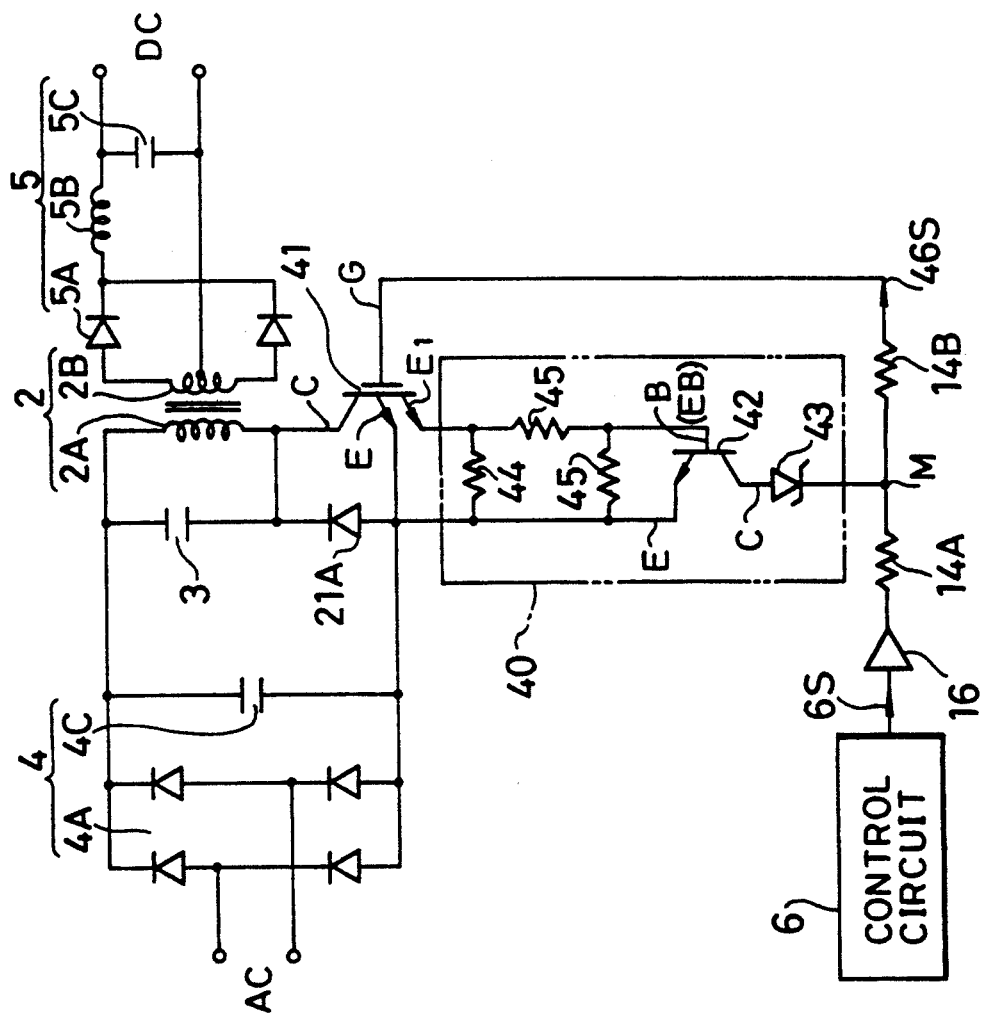
FIG. 4 is a circuit diagram showing a switching power supply in accordance with a third embodiment of the present invention.

FIG. 4 is a circuit diagram showing a switching power supply in accordance with a third embodiment of the present invention. This embodiment uses, as a switching device, an IGBT (Insulated Gate Bipolar Transistor) 41 with a current sense terminal E1. The collector C of the IGBT 41 is connected to a second terminal of a primary winding 2A, and the emitter E is connected to the negative (grounded) terminal of a direct current power supply 4, thus arranging a primary circuit. Another emitter, namely, the current sense terminal E1, is connected to the negative terminal of the power supply 4 through a detection resistor 44. The resistor 44, together with a voltage dividing resistors 45, a transistor 42 and a Zener diode 43 constitute an overcurrent protective circuit 40. Here, the voltage dividing resistors 45 divide the detection voltage, and applies the divided voltage across the base and emitter of the transistor 42. The Zener diode 43 is connected between the collector of the transistor 42 and the midpoint M of two serial resistors 14A and 14B in such a manner that the Zener diode stops the collector current of the transistor 42. The serial resistors 14A and 14B are connected between the output terminal of the amplifier 16 and the gate of the IGBT 41.

In the overcurrent protective circuit 40, when the base voltage EB of the transistor 42 at which the transistor turns on is preset at a value corresponding to the rated current of the switching power supply by adjusting the resistors 44 and 45, the transistor 42 is in the off state in the normal operation where the output current is equal to or less than the rated current. In this case, the operation is controlled only by the driving signal 6S produced from a control circuit 6.

On the other hand, when an overcurrent exceeding the rated current occurs in an external load, the detection voltage increases, which in turn increases the base voltage of the transistor 42, and decreases the collector-to-emitter voltage. As a result, the voltage of the midpoint M becomes to be controlled by the Zener voltage of the Zener diode 43. Thus, the selection of the Zener voltage of the Zener diode 43 enables the amplitude of the driving signal 46S applied to the IGBT 41 to be reduced to such a value as to limit the overcurrent to a value equal to or less than the rate current, thereby preventing damage to the IGBT 41 due to the overcurrent.

The switching power supply thus arranged can achieve effects similar to those of the first and second embodiment. In addition, the circuit configuration of the overcurrent protective circuit 40 can be further simplified.

The invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A switching power supply comprising:
    a transformer having a primary winding and a secondary winding, the primary winding having first and second terminals;
    a resonant capacitor connected across the first and second terminals of the primary winding;
    a direct current power supply having a first output terminal which is connected to the first terminal of the primary winding, the direct current power supply additionally having a second output terminal;
    a switching device to switch a primary current flowing through the primary winding, the switching device being a current sense IGBT having a collector, and emitter, a gate, and a current sense terminal, the collector being connected to the second terminal of the primary winding and the emitter being connected to the second output terminal of the direct current power supply;
    a serial resistor;
    a control circuit for supplying the gate of the current sense IGBT with a drive signal via the serial resistor;
    a rectifier circuit for rectifying a secondary current flowing through the secondary winding so as to output the rectified current as an output of the switching power supply; and
    an overcurrent protection circuit which includes
        a detection resistor for detecting the primary current to produce a detected voltage, the detection resistor being connected between the current sense terminal of the current sense IGBT and the second output terminal of the direct current power supply,
        a further resistor,
        a Zener diode to produce a reference voltage, and
        an amplifier which produced an overcurrent protective signal when the detected voltage exceeds the reference voltage and supplies the overcurrent protective signal to the gate of the current sense IGBT through the serial resistor so that the amplitude of the drive signal is decreased when an overcurrent of the secondary current occurs, the amplifier including a transistor having an emitter that is connected to the second output terminal of the direct current power supply, a base that receives the detected voltage via the further resistor, and a collector that is connected to the gate of the current sense IGBT through the Zener diode and the serial resistor.

2. A switching power supply, comprising:
a transformer having a primary winding and a secondary winding;
a resonant capacitor connected parallel to the primary winding of the transformer;
a switching device having a control terminal;
a direct current power supply having first and second output terminals, the primary winding of the transformer and the switching device being connected in a circuit path between the first and second output terminals;
a serial resistor having a first end and having a second end that is connected to the control terminal of the switching device;
a control circuit which continuously generates a pulse train to control the on/off duration ratio of the switching device;
means for conveying the pulse train from the control circuit to the first end of the serial resistor, the pulse train being conveyed through the serial resistor to the control terminal of the switching device;
a direct current output circuit connected to the secondary winding of the transformer;
first means for sensing the current through the primary winding of the transformer; and
second means for modifying the amplitude of the pulse train without discontinuing the pulse train so as to reduce but not eliminate the current through the switching device if the current sensed by the first means exceeds a predetermined value,
wherein the switching device is a MOSFET having a drain, a source, a current sense terminal, and a gate, the gate being the control terminal, one of the drain and source being connected to the primary winding of the transformer and the other of the drain and source being connected to one of the output terminals of the direct current power supply,
wherein the first means includes a detection resistor having a first end that is connected to said one of the output terminals and a second end that is connected to the current sense terminal, and
wherein the second means includes a comparator having a pair of comparator input terminals and having an output terminal that is connected to the first end of the serial resistor, a resistor connecting the second end of the detection resistor to one of the comparator input terminals, and means connected to the other comparator input terminal for generating an offset voltage.

3. A switching power supply, comprising:
a transformer having a primary winding and a secondary winding;
a resonant capacitor connected parallel to the primary winding of the transformer;
a switching device having a control terminal;
a direct current power supply having first and second output terminals, the primary winding of the transformer and the switching device being connected in a circuit path between the first and second output terminals;
a serial resistor having a first end and having a second end that is connected to the control terminal of the switching device;
a control circuit which continuously generates a pulse train to control the on/off duration ratio of the switching device;
means for conveying the pulse train from the control circuit to the first end of the serial resistor, the pulse train being conveyed through the serial resistor to the control terminal of the switching device;
a direct current output circuit connected to the secondary winding of the transformer;
first means for sensing the current through the primary winding of the transformer; and
second means for modifying the amplitude of the pulse train without discontinuing the pulse train so as to reduce but not eliminate the current through the switching device if the current sensed by the first means exceeds a predetermined value,
wherein the means for conveying the pulse train from the control circuit to the first end of the serial resistor includes another serial resistor,
wherein the switching device is an insulated gate bipolar transistor having a collector, an emitter, a current sense terminal, and a gate, the gate being the control terminal, one of the collector and emitter being connected to the primary winding of the transformer and the other of the collector and emitter being connected to one of the output terminals of the direct current power supply,
wherein the first means includes a detection resistor having a first end that is connected to said one of the output terminals and a second end that is connected to the current sense terminal, and
wherein the second means includes a pair of voltage dividing resistors connected in series between the current sense terminal and said one of the output terminals, the voltage dividing resistors being connected to one another at an intermediate connection point, a further transmission having a base and a collector-emitter path, the base of the further transistor being connected to the intermediate connection point, and a Zener diode, the Zener diode and the collector-emitter path of the further transistor being connected in series between said one of the output terminals and the first end of the serial resistor.

* * * * *